(12) United States Patent
Chandra et al.

(10) Patent No.: US 10,103,910 B1
(45) Date of Patent: Oct. 16, 2018

(54) PULSE AMPLITUDE MODULATION EQUALIZATION OPTIMIZATION SYSTEM

(71) Applicant: Dell Products L.P., Round Rock, TX (US)

(72) Inventors: Umesh Chandra, Santa Cruz, CA (US); Bhyrav M. Mutnury, Austin, TX (US); Arun Reddy Chada, Round Rock, TX (US); Han Deng, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/903,978

(22) Filed: Feb. 23, 2018

(51) Int. Cl.
  *H04B 3/46* (2015.01)
  *H04L 25/03* (2006.01)
  *H04L 1/00* (2006.01)

(52) U.S. Cl.
  CPC ...... *H04L 25/03949* (2013.01); *H04L 1/0072* (2013.01); *H04L 25/03038* (2013.01)

(58) Field of Classification Search
  CPC ......... H04L 25/03949; H04L 25/03038; H04L 1/0072
  USPC ....... 375/229, 230, 231, 260, 262, 265, 267; 370/203, 204, 208, 209
  See application file for complete search history.

(56) References Cited

U.S. PATENT DOCUMENTS

| | | | |
|---|---|---|---|
| 9,077,574 B1 | 7/2015 | Healey et al. | |
| 9,762,423 B2 * | 9/2017 | Baecher | H04L 27/2275 |
| 2013/0243066 A1 | 9/2013 | Palusa et al. | |
| 2013/0293066 A1 * | 11/2013 | Tsuzuki | B06B 1/0629 |
| | | | 310/334 |
| 2015/0195108 A1 * | 7/2015 | Prokop | H04L 25/03057 |
| | | | 375/233 |

* cited by examiner

*Primary Examiner* — Dhaval Patel
(74) *Attorney, Agent, or Firm* — Haynes and Boone, LLP

(57) ABSTRACT

A PAM equalization optimization system includes a BIOS coupled to a PAM engine and an equalization engine. The BIOS determines an effective equalization tap number of equalization taps that each provide an equalization result above a predetermined amount. The BIOS then determines whether the effective equalization tap number is greater than a predetermined fraction of an available equalization tap number of equalization taps that are available for equalizing a signal. When the effective equalization tap number is greater than the predetermined fraction of the available equalization tap number, the BIOS causes the equalization engine to perform per-symbol equalization on signals modulated using the PAM engine. When the effective equalization tap number is not greater than the predetermined fraction of the available equalization tap number, the BIOS causes the equalization engine to perform per-bit equalization on signals modulated using the PAM engine.

20 Claims, 11 Drawing Sheets

PULSE AMPLITUDE MODULATION EQUALIZATION OPTIMIZATION SYSTEM

BACKGROUND

The present disclosure relates generally to information handling systems, and more particularly to optimizing the equalization of pulse amplitude modulated signals transmitted by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, switch devices, and/or other computing devices known in the art, use modulation techniques to transmit information in signals sent to other computing devices. For example, Non-Return-to-Zero (NRZ) is a modulation technique in which information is provided in a signal via binary code in which ones are represented by a first condition (e.g., typically a positive voltage) and zeros are represented by a second condition (e.g., typically a negative voltage.) However, as higher signal transmission speeds become more desirable, NRZ become bandwidth inefficient. In order to address these issues, Pulse Amplitude Modulation (PAM) techniques such as, for example, PAM with a 4-level modulation scheme (PAM4), may be implemented to achieve high data rates using less bandwidth than NRZ.

However, channel losses (e.g., losses due to the printed circuit board, silicon package, connectors, vias, and/or other elements that are part of the signal transmission subsystem in the computing device) can negatively affect signals transmitted using PAM4 (e.g., making it difficult to distinguish between the bits being transmitted at different signals levels), and equalization of those signals is often implemented in order improve signal integrity (e.g., which ensures that bits transmitted at different signals levels may be identified at those signal levels and/or distinguished from each other.) However, signals transmitted using PAM4 produce a complicated eye diagram (e.g., including three slices and 12 distinct transitions between levels), and the equalizations and other signal optimizations for signals transmitted using PAM4 that have been adapted from binary signal equalization methods may require a variety of approaches to produce signals with desired characteristics. For example, conventional PAM4 equalization systems may equalize signals transmitted using PAM4 and based either on bit information ("per-bit equalization") or based on symbol changes ("per-symbol equalization"). However, the channel losses discussed above can change based on changes to the signal transmission subsystem in the computing device, and thus the use of either per-bit equalization or per-symbol equalization can result in non-optimal equalization of signals transmitted using PAM4 in many instances. For example, when a signal over-equalized, the signal may experience "overshooting" as the levels start mixing with each other.

Accordingly, it would be desirable to provide an improved pulse amplitude modulation equalization system.

SUMMARY

According to one embodiment, an Information Handling System (IHS) includes a modulation subsystem; a processing system that is coupled to the modulation subsystem; and a memory system that is coupled to the processing system and that includes instruction that, when executed by the processing system, cause the processing system to perform operations comprising: determining an effective equalization tap number that is indicative of a number of equalization taps that each provide an equalization result above a predetermined amount; determining whether the effective equalization tap number is greater than a predetermined fraction of an available equalization tap number, wherein the available equalization tap number is indicative of a number of equalization taps that are available for equalizing a signal; causing, when the effective equalization tap number is greater than the predetermined fraction of the available equalization tap number, the modulation subsystem to perform per-symbol equalization on signals modulated using Pulse Amplitude Modulation (PAM); and causing, when the effective equalization tap number is not greater than the predetermined fraction of the available equalization tap number, the modulation subsystem to perform per-bit equalization on signals modulated using PAM.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
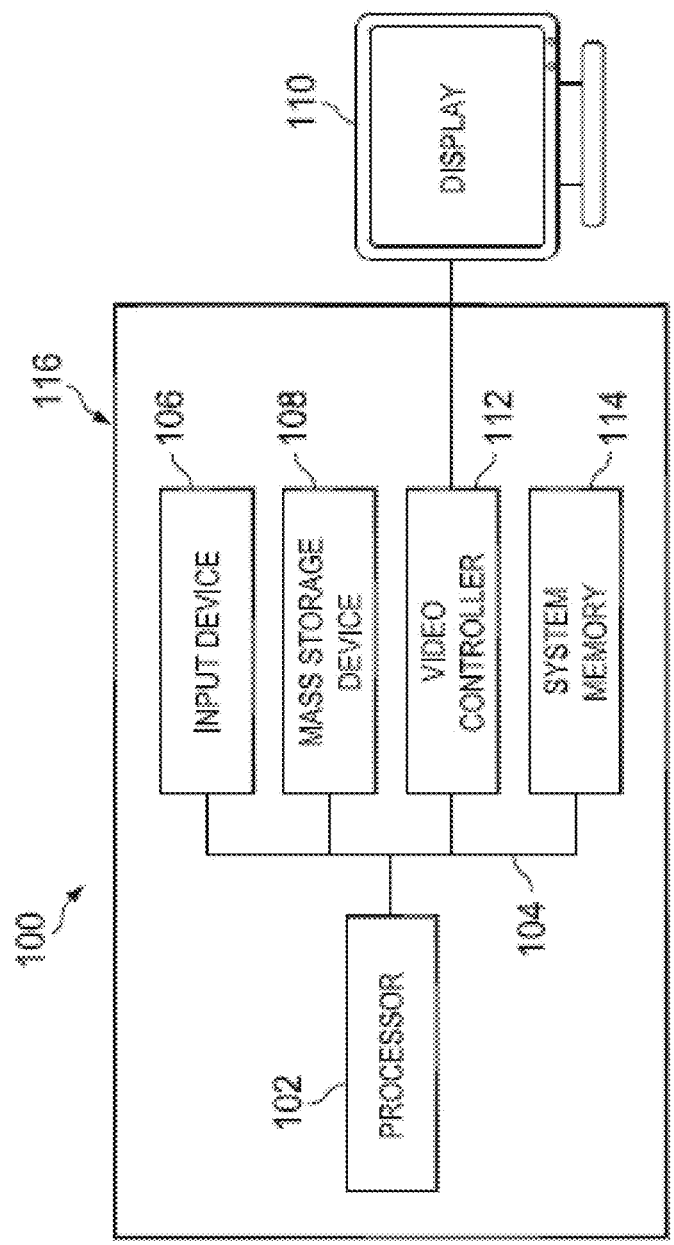
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
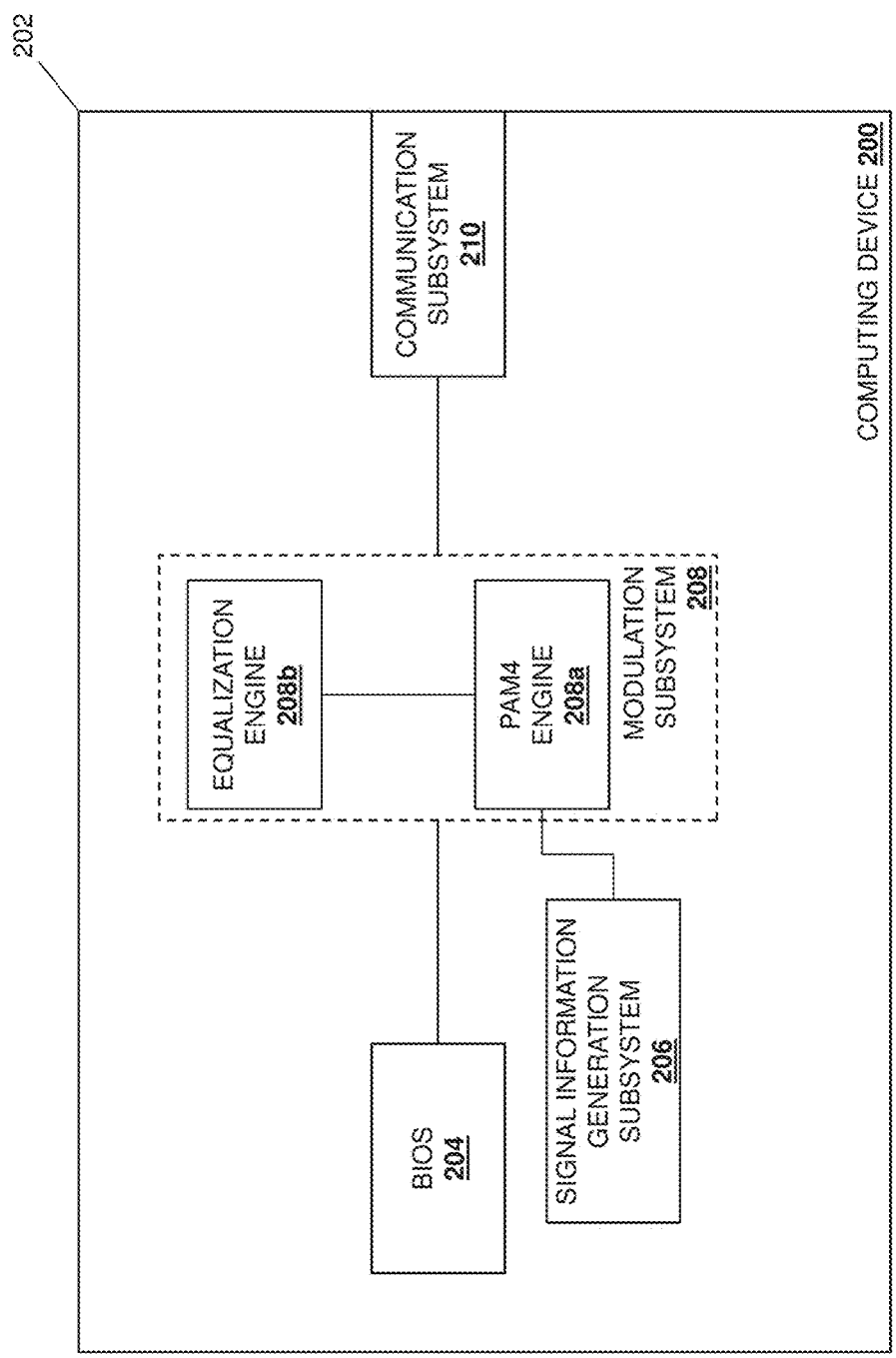
FIG. 2 is a schematic view illustrating an embodiment of a computing device.

Referring now to FIG. 2, an embodiment of a computing device 200 is illustrated that may be the IHS 100 discussed above with reference to FIG. 1, and/or that may include some or all of the components of the IHS 100. In the illustrated embodiment, the computing device 200 includes a chassis 202 that houses the components of the computing device 200, only some of which are illustrated in FIG. 2. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instruction that, when executed by the processing system, cause the processing system to perform the functions of the computing device 200 discussed below. In the embodiments illustrated and described below, the processing system/memory system combination is configured to provide a Basic Input/Output System (BIOS) 204 that performs the functions discussed below. As would be understood by one of skill in the art in possession of the present disclosure, a BIOS may be provided by non-volatile firmware (e.g., the processing system/memory system discussed above) that is configured to perform hardware initialization during a booting process of the computing device 200 (e.g., power-on startup or other initializations), as well as to provide runtime services for operating systems and/or other programs/applications. However, in other embodiments, other computing device subsystems may provide the functionality discussed below while remaining within the scope of the present disclosure.

The chassis 202 may also house a signal information generation subsystem 206 that may be provided by combinations of hardware (e.g., signal generation hardware) and software (e.g., applications/programs) that are configured to generate information for signals that are to be transmitted by the computing device 200 to other computing devices. The chassis 202 may also house a modulation subsystem 208 that is coupled to the BIOS 204 and the signal information generation subsystem 206, and that may be configured (e.g., by the BIOS 204 as discussed below) to perform pulse amplitude modulation (PAM) and equalization on information generated by the signal information generation subsystem 206 for signals that are to be transmitted by the computing device 200. In the illustrated embodiment, the modulation subsystem 208 includes a PAM4 engine 208a that is configured to modulate signals using a four-level PAM scheme, although other PAM schemes may benefit similarly from the teachings of the present disclosure as thus are envisioned as falling within its scope. In the illustrated embodiment, the modulation subsystem 208 also includes an equalization engine 208b that is configured to provide for the equalization of signals modulated by the PAM4 engine 208a. In the embodiments discussed below, the equalization engine 208b is configured to perform Feed Forward Equalization (FFE), although other equalization methods may fall within the scope of the present disclosure as well. While the PAM4 engine 208a and the equalization engine 208b are illustrated as separate components if the modulation subsystem 208 for clarity of discussion below, one of skill in the art in possession of the present disclosure will recognize that they may be substantially integrated in the modulation subsystem 208 while remaining within the scope of the present disclosure.

The chassis 202 may also house a communication subsystem 210 that is coupled to the modulation subsystem 208 and that is configured to transmit signals modulated and equalized by the modulation subsystem 208 to other computing devices. As such, the communication subsystem 210 may provide a plurality of links via hardware ports (e.g., on a Network Interface Controller (NIC)), wireless communication subsystems (e.g., WiFi communication subsystems, BLUETOOTH® communication subsystems, Near Field Communication (NFC) subsystems, etc.), and/or any other communication components that would be apparent to one of skill in the art in possession of the present disclosure. While the embodiments discussed below focus on the modulation of signals transmitted from the computing device 200, one of skill in the art in possession of the present disclosure will recognize that the chassis 202 may also include hardware and/or software that is configured to receive similar signals and demodulate those signals so that the information included therein may be consumed by components of the computing device 200. While a specific computing device 200 has been illustrated and described, one of skill in the art in possession of the present disclosure will recognize that computing devices may include a variety of different components and/or components configurations to provide for conventional computing device functionality, as well as the functionality described below, while remaining within the scope of the present disclosure.

Figure 3:
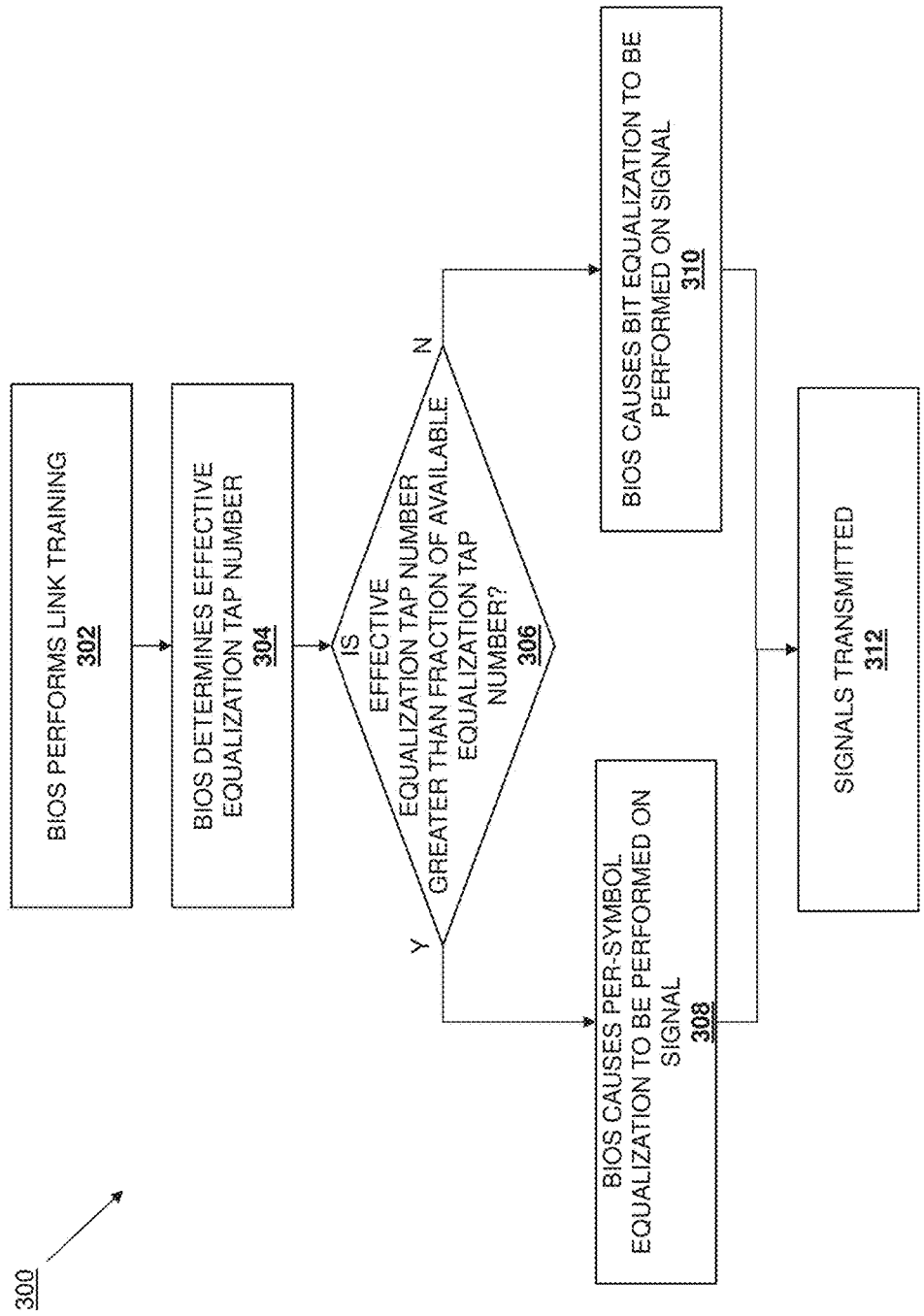
FIG. 3 is a flow chart illustrating an embodiment of a method for optimizing the equalization of pulse amplitude modulated signals.

Referring now to FIG. 3, an embodiment of a method 300 for optimizing the equalization of pulse amplitude modulated signals is illustrated. As discussed below, the systems and methods of the present disclosure provide for the application of different equalization techniques on a modulated signal based on the channel used to transmit that modulated signal and/or the properties of that modulated signal. As discussed below, signals transmitted using different channels may behave differently based on the characteristics of those channels, based on the speed the signal being transmitted, and/or based on other factors that would be apparent to one of skill in the art in possession of the present disclosure. For example, some channels have characteristics that result in relatively low insertion loss deviation, while some channels have characteristics that result in relatively high insertion loss deviation, and it has been found that the type of equalization technique that provides for the most desirable signal characteristics for signals transmitted using those channels will differ. The systems and methods of the present disclosure operate, for different channels, the same channel with modified components, and/or the same channel transmitting signals with different characteristics (e.g., transmission speed), to determine an effective number of equalization taps and compare the result to an available number of equalization taps. Based on that comparison, it has been found that one of a plurality of equalization techniques may be selected for application to a pulse amplitude modulated signal that provides an equalized modulated signal with relatively desirable characteristics (i.e., compared to modulated signals equalized using the other equalization techniques.)

In order to provide clarity to the discussion of the systems and methods of the present disclosure, the concepts of PAM4, per-bit FFE, and per-symbol FFE are described below. However, while these specific modulation and equalization techniques are described in detail, one of skill in the art in possession of the present disclosure will recognize that other modulation and equalization techniques may benefits from the teachings of the present disclosure and thus are envisioned as falling within its scope as well.

Figure 4:
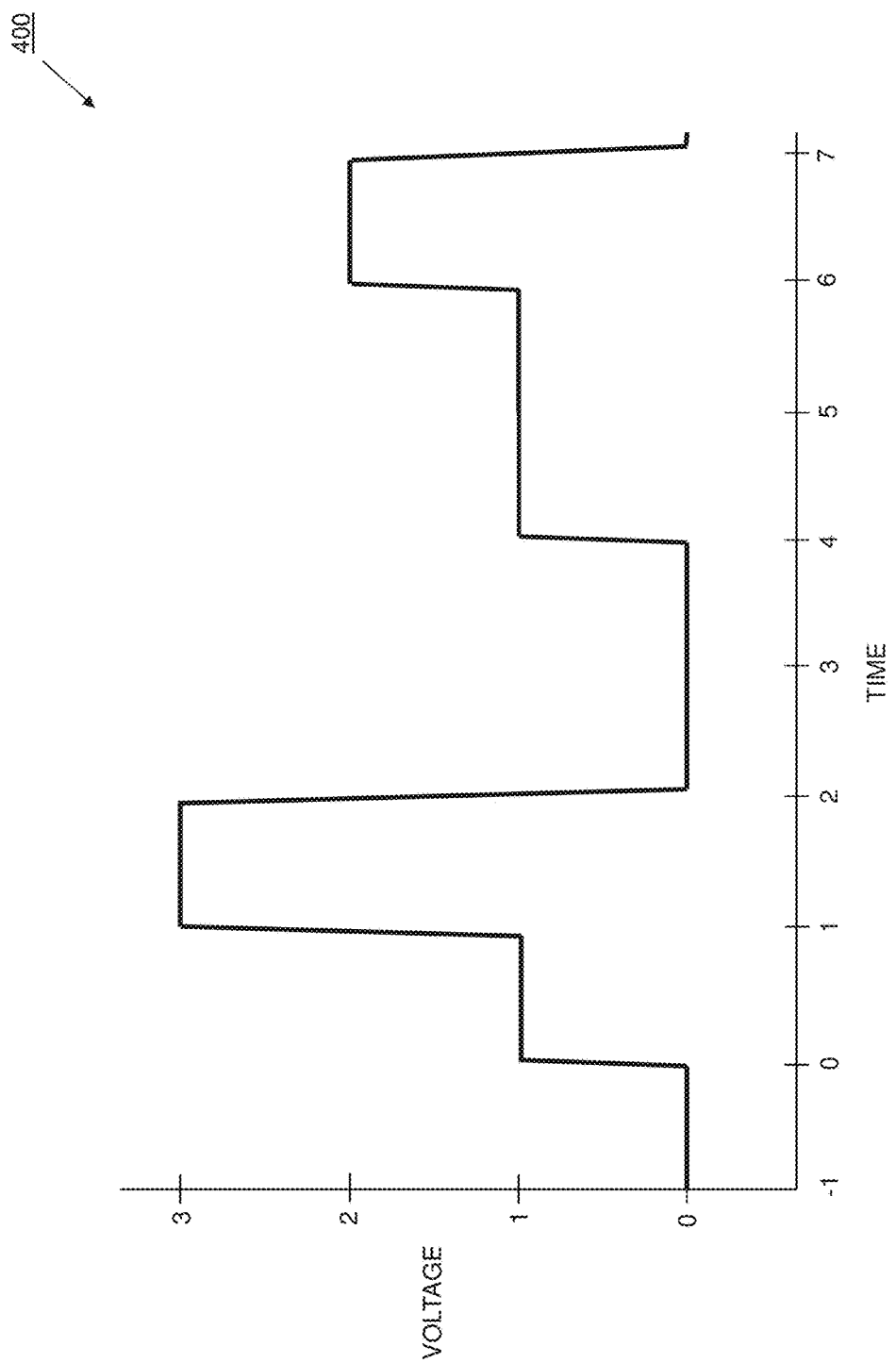
FIG. 4 is a chart illustrating an embodiment of an ideal PAM4 signal.

With reference to FIG. 4, a chart 400 is provided that illustrates an embodiment of an ideal PAM4 signal. In the illustrated embodiment, a normalized time is provided on the X-axis, and a normalized voltage is provided on the Y-axis. As discussed above, PAM4 is a 4-level Pulse Amplitude Modulation scheme, and the chart 400 illustrates the four levels as level 0, level 1, level 2, and level 3. As would be understood by one of skill in the art in possession of the present disclosure, PAM4 provides an improvement to binary NRZ modulation schemes by doubling the number of bits transmitted in a particular time period without increasing the bandwidth required, which is accomplished by increasing the number of signal levels from the two levels available in binary NRZ modulation schemes to the four levels illustrated in FIG. 4, with each signal level providing a two bit symbol rather than the 1 bit provided by either of the two signal levels available in binary NRZ modulation schemes. For example, while binary NRZ modulation schemes can transmit a single bit using one of two different signal levels during each time period (e.g., either a 0 or a 1 during each of the time periods −1 through 7 in the chart 400), PAM4 may be utilized to transmit two bits using any of four different signal levels during each time period (e.g., any of a 00, a 01, a 10, or a 11 during each of the time periods −1 through 7 in the chart 400.)

As such, with reference to the particular signal detailed in the chart 400 of FIG. 4, two bits (e.g., 00) are transmitted using signal level 0 between times −1 and 0, two bits (e.g., 01) are transmitted using signal level 1 between times 0 and 1, two bits (e.g., 11) are transmitted using signal level 3 between times 1 and 2, two bits (e.g., 00) are transmitted using signal level 0 between times 2 and 3, two bits (e.g., 00) are transmitted using signal level 0 between times 3 and 4, two bits (e.g., 01) are transmitted using signal level 1 between times 4 and 5, two bits (e.g., 01) are transmitted using signal level 1 between times 5 and 6, and two bits (e.g., 10) are transmitted using signal level 2 between times 6 and 7. As will be appreciated by one of skill in the art in possession of the present disclosure, the signal illustrated in chart 400 is ideal in that each signal level is met by the signal exactly, which would allow a receiving system to easily identify the pair of bits provided at each signal level.

Figure 5:
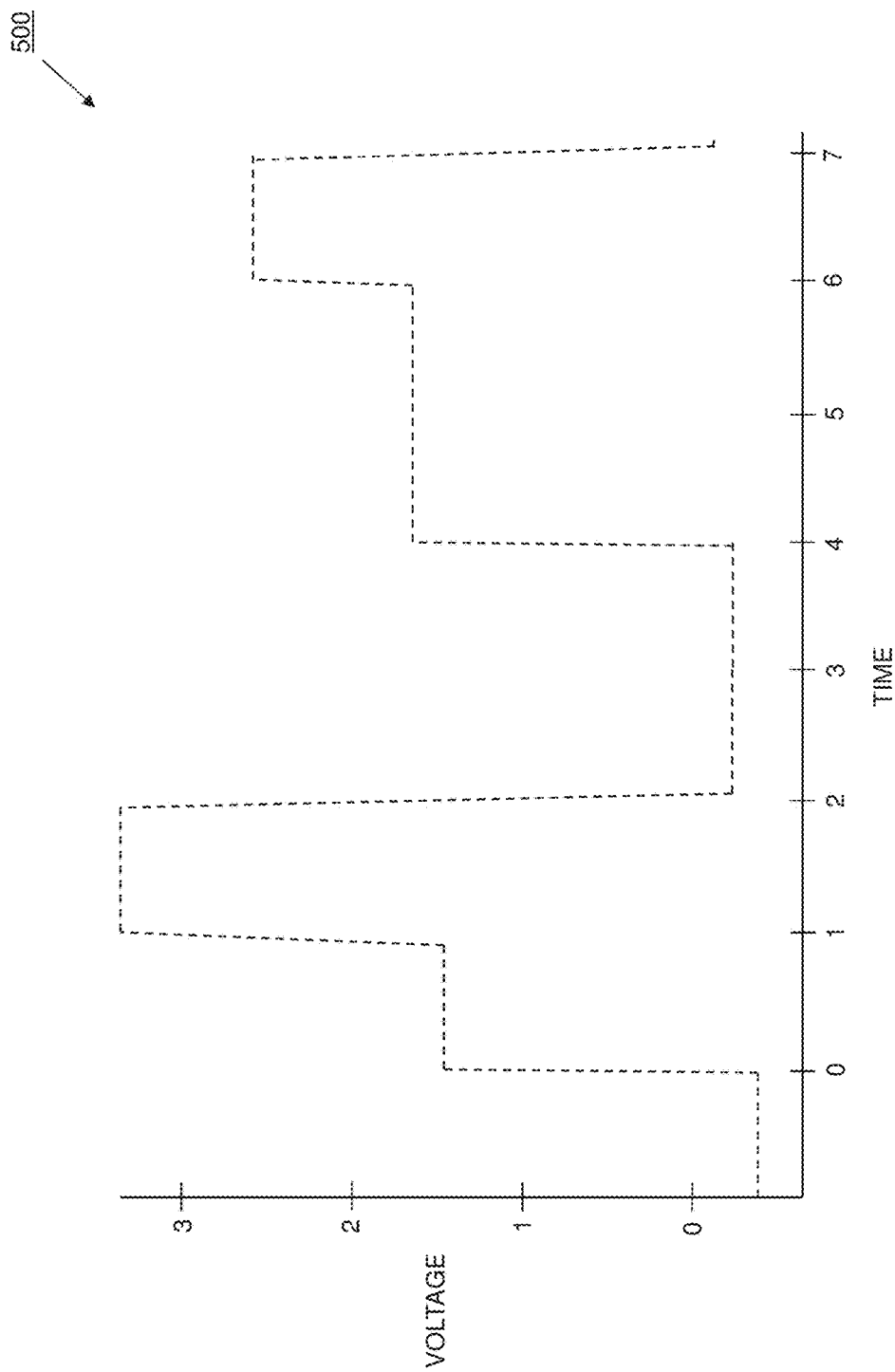
FIG. 5 is a chart illustrating an embodiment of a PAM4 signal with channel losses.

Referring now to FIG. 5, a chart 500 is provided that illustrates an embodiment of a PAM4 signal with channel losses that can cause the signal to overshoot or undershoot the designed signal level. As such, the chart 500 provides a more "realistic" view of a signal, although one of skill in the art will recognize that real-world signals do not include the sharp transmissions illustrated between time periods in FIG. 5 (which has been provided for clarity of discussion below), and rather transition more gradually (i.e., via curved transitions that can overshoot/undershoot the signal levels.) As with the chart 400, a normalized time is provided on the X-axis, and a normalized voltage is provided on the Y-axis. As such, with reference to the particular signal detailed in the chart 500 of FIG. 5, the signal has undershot the signal level 0 between times −1 and 0, the signal has overshot the signal level 1 between times 0 and 1, the signal has overshot the signal level 3 between times 1 and 2, the signal has undershot the signal level 0 between times 2 and 3, the signal has undershot the signal level 0 between times 3 and 4, the signal has overshot the signal level 1 between times 4 and 5, the signal has overshot the signal level 1 between times 5 and 6, and the signal has overshot the signal level 2 between times 6 and 7.

Figure 6:
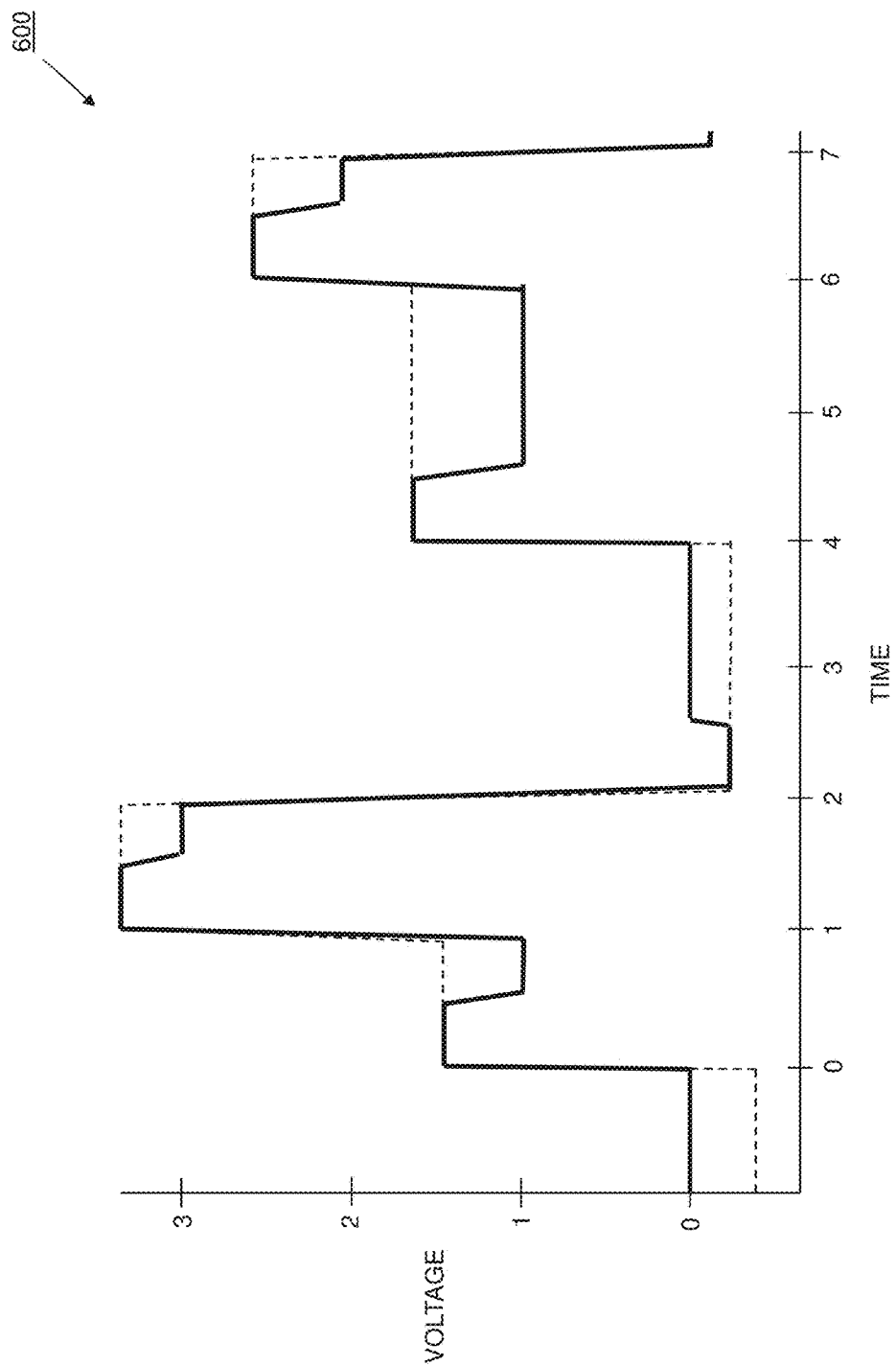
FIG. 6 is a chart view illustrating an embodiment the PAM4 signal of FIG. 5 after per-bit equalization.

In order to ensure that signals like those illustrated in the chart 500 of FIG. 5 are properly interpreted by the receiving system, equalization techniques are performed on those signals. Referring now to FIG. 6, an embodiment of chart 600 illustrates how a per-bit Feed Forward Equalization (FFE) technique may be applied to the signal in the chart 500 of FIG. 5, with the original/unequalized signal of FIG. 5 indicated by the dashed line, and the equalized signal indicated by the bolded line. As described below, using the per-bit FFE technique, the signal is equalized following the transmission of the first bit in a particular time period such that the signal is adjusted towards the desired signal level. As with the charts 400 and 500, a normalized time is provided on the X-axis, and a normalized voltage is provided on the Y-axis.

As such, with reference to the particular signal detailed in the chart 600 of FIG. 6, the original signal that would have overshot the signal level 1 between times 0 and 1 was equalized following the transmission of its first bit (i.e., the 0 in the 01 being transmitted at signal level 1) to provide an equalized signal that it is closer to the signal level 1 between times 0 and 1 than the original signal, the original signal that would have overshot the signal level 3 between times 1 and 2 was equalized following the transmission of its first bit (i.e., the first 1 in the 11 being transmitted at signal level 3) to provide an equalized signal that it is closer to the signal level 3 between times 1 and 2 than the original signal, the original signal that would have undershot the signal level 0 between times 2 and 3 was equalized following the transmission of its first bit (i.e., the first 0 in the 00 being transmitted at signal level 0) to provide an equalized signal that it is closer to the signal level 0 between times 2 and 3 than the original signal, the original signal that would have undershot the signal level 0 between times 3 and 4 was equalized by the equalization operation performed on the signal between times 2 and 3, the original signal that would have overshot the signal level 1 between times 4 and 5 was equalized following the transmission of its first bit (i.e., the 0 the 01 being transmitted at signal level 1) to provide an equalized signal that it is closer to the signal level 1 between times 4 and 5 than the original signal, the original signal that would have overshot the signal level 1 between times 5 and 6 was equalized by the equalization performed on the signal between times 4 and 5, and the original signal that would have overshot the signal level 2 between times 6 and 7 was equalized following the transmission of its first bit (i.e., the 1 in the 10 being transmitted at signal level 2) to provide an equalized signal that it is closer to the signal level 2 between times 6 and 7 than the original signal. As such, the per-bit equalization provides for the equalization of a PAM4 signal following the transmission of a first bit transmitted at the signal level in any particular time period, which is intended to operate to adjust that signal closer to the desired signal level, and need only be performed for the first of any consecutive time periods in which the signal remains at a particular signal level (e.g., as illustrated in FIG. 6 for the time periods between times 2 and 4, and for the time periods between times 4 and 6).

Figure 7:
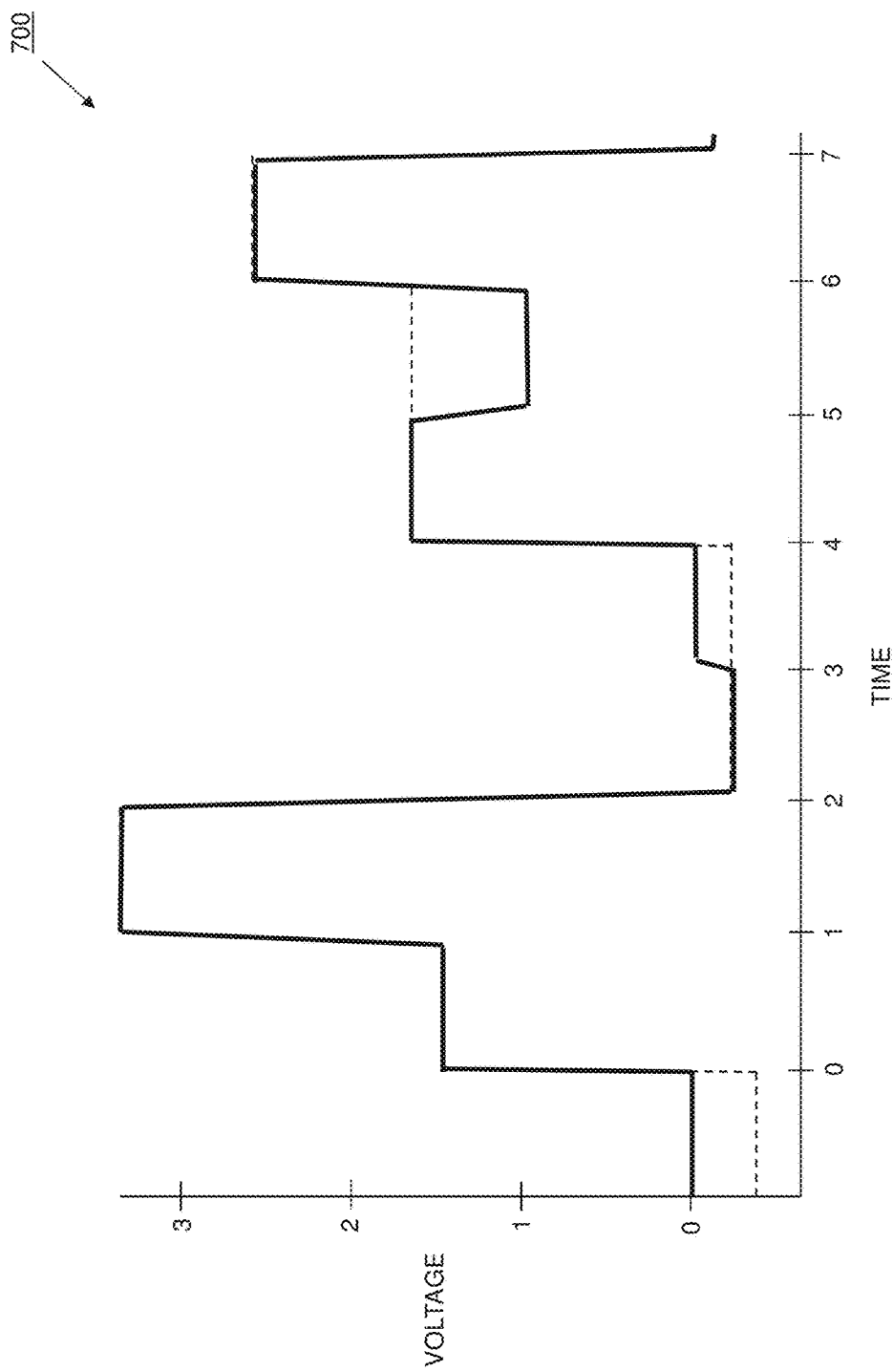
FIG. 7 is a chart view illustrating an embodiment the PAM4 signal of FIG. 5 after per-symbol equalization.

Referring now to FIG. 7, an embodiment of chart 700 illustrates how a per-symbol Feed Forward Equalization (FFE) technique may be applied to the signal in the chart 500 of FIG. 5, with the original/unequalized signal of FIG. 5 indicated by the dashed line, and the equalized signal indicated by the bolded line. Using the per-symbol FFE technique, the signal is equalized following the transmission of a first two bit symbol that is followed by a second two bit symbole at the same signal level such that the signal is adjusted towards the desired signal level whenever consecutive time periods include signals at the same signal level. As with the charts 400, 500, and 600, a normalized time is provided on the X-axis, and a normalized voltage is provided on the Y-axis.

As such, with reference to the particular signal detailed in the chart 700 of FIG. 1, the signal was allowed to overshoot the signal level 1 between times 0 and 1 because of the transition of the signal to a different signal level following time 1, the original signal was allowed to overshoot the signal level 3 between times 1 and 2 because of the transition of the signal to a different signal level following time 2, the original signal was allowed to overshoot the signal level 0 between times 2 and 3 while the original signal that would have undershot the signal level 0 between times 3 and 4 was equalized when that original signal did not transition to a different signal level between times 3 and 4 and following time 2, the original signal was allowed to overshoot the signal level 1 between times 4 and 5 while the original signal that would have overshot the signal level 1 between times 5 and 6 was equalized when that signal did not transition to a different signal level between times 5 and 6 and following time 4, and the original signal was allowed to overshoot the signal level 2 between times 6 and 7 because of the transition of the signal to a different signal level following time 7. As such, the per-symbol equalization provides for the equalization of a PAM4 signal following the transmission of a two bit symbol only if the subsequent two bit symbol (i.e., transmitted in the subsequent, consecutive time period) is transmitted at the same signal level, which is intended to operate to adjust that signal closer to the desired signal level.

One of skill in the art in possession of the present disclosure will recognize that the per-bit FFE technique and the per-symbol FFE technique illustrated in FIGS. 6 and 7 have been greatly simplified (i.e., utilizing only two equalization taps, discussed in further detail below) in order to provide a basic understanding of embodiments of two different equalization techniques that may be utilized according to the teachings of the present disclosure. For a more general understanding of per-bit equalization and per-symbol equalization, the output signal y(n) of an FFE equalizer may be represented by the convolution of the input and tap-coefficients as per the equation:

$$y(n) = \sum_{k=-Npre}^{Npost} c_k x(n-k)$$

where $c_k$ represents the tap coefficients, $N_{pre}$ and $N_{post}$ represent the number of pre-taps and post taps, respectively, n represents the index of the sampled signal, x(n) represents the equalizer's input signal, x represents the pulse response output, and k represents the bit number.

Furthermore, the FFE transfer function $H_{ffe}(f)$ is provided by the equation:

$$H_{ffe}(f) = \sum_{k=-Npre}^{Npost} c_k e^{-j2\pi fkT}$$

where T is the equalizer's sampling period. When the signal is equalized per-symbol, T is equal to the symbol length, which is 2/(datarate). When the signal is equalized per-bit, T is equal to 1/(datarate).

Figure 8A:
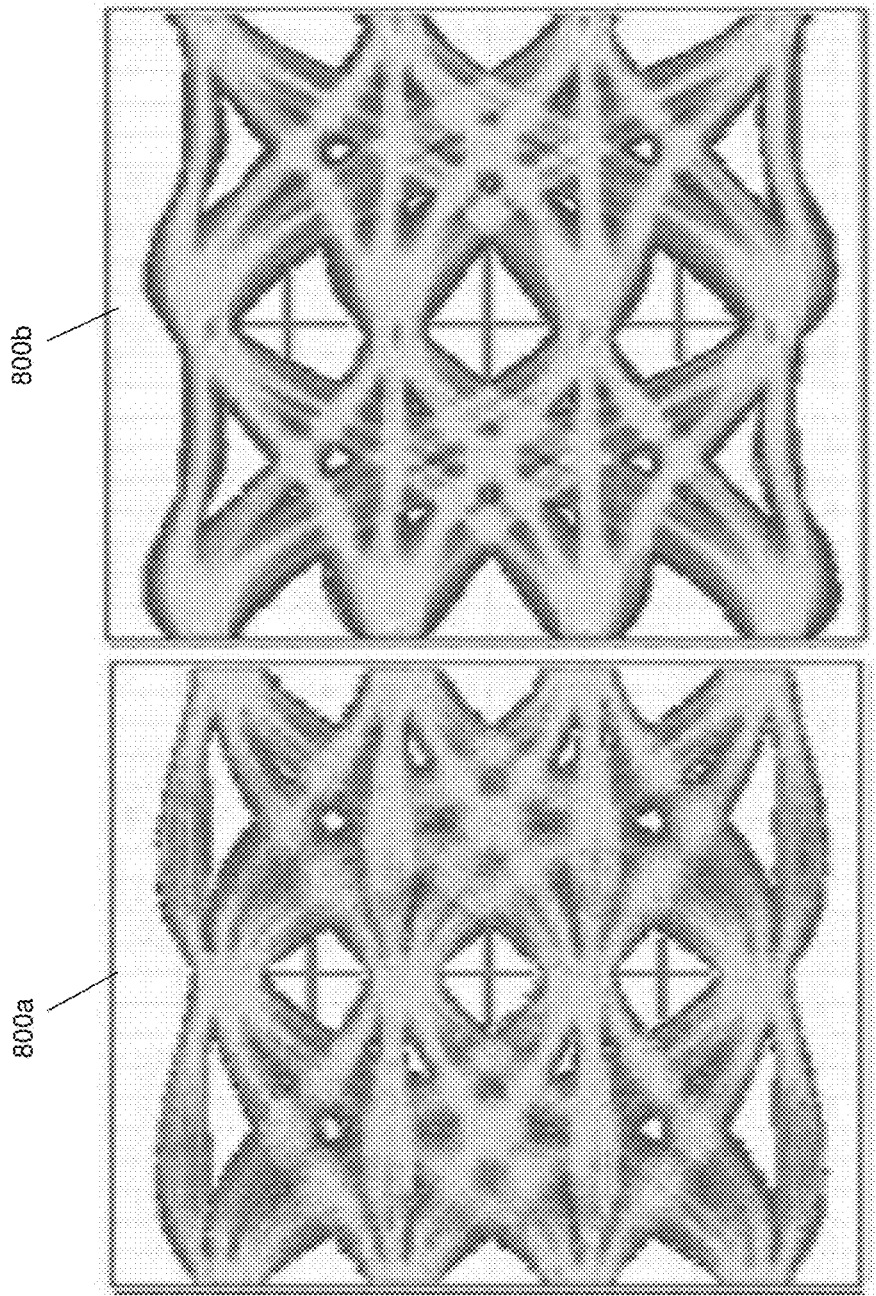
FIG. 8A is chart view illustrating an embodiment of eye pattern diagrams for a first channel having undergone both per-bit equalization and per-symbol equalization.
Figure 8B:
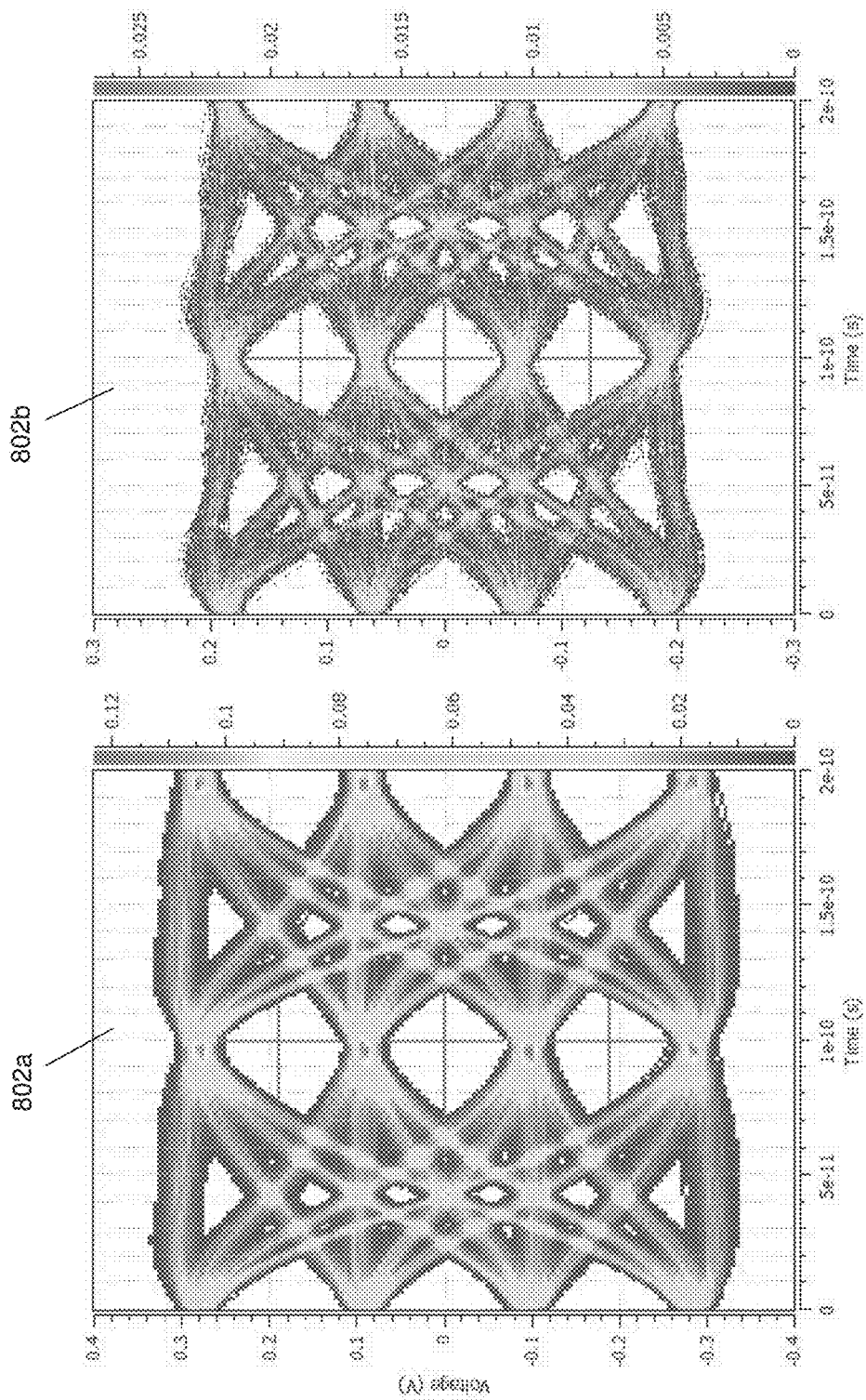
FIG. 8B is chart view illustrating an embodiment of eye pattern diagrams for a second channel having undergone both per-symbol equalization and per-bit equalization.

While both per-bit equalization and per-symbol equalization have proven to be effective, conventionally, it has been difficult to determine which equalization technique is more effective for any particular situation (e.g., channel configurations having relatively high insertion loss deviation vs. channel configurations having relatively low insertion loss deviations). For example, FIG. 8A illustrates an eye pattern diagram 800a for a first channel having undergone per-symbol equalization, and an eye pattern diagram 800b for that first channel having undergone per-bit equalization. As can be seen, the eye pattern diagrams indicate that per-bit equalization is more effective for the first channel relative to per-symbol equalization (i.e., due to the larger eye opening in the eye pattern diagram 800b relative to the eye pattern diagram 800a.) In another example, FIG. 8B illustrates an eye pattern diagram 802a for a second channel having undergone per-symbol equalization, and an eye pattern diagram 802b for that second channel having undergone per-bit equalization. As can be seen, the eye pattern diagrams indicate that per-symbol equalization is more effective for the second channel relative to per-symbol equalization (i.e., due to the larger eye opening in the eye pattern diagram 802a relative to the eye pattern diagram 802b.)

Figure 9:
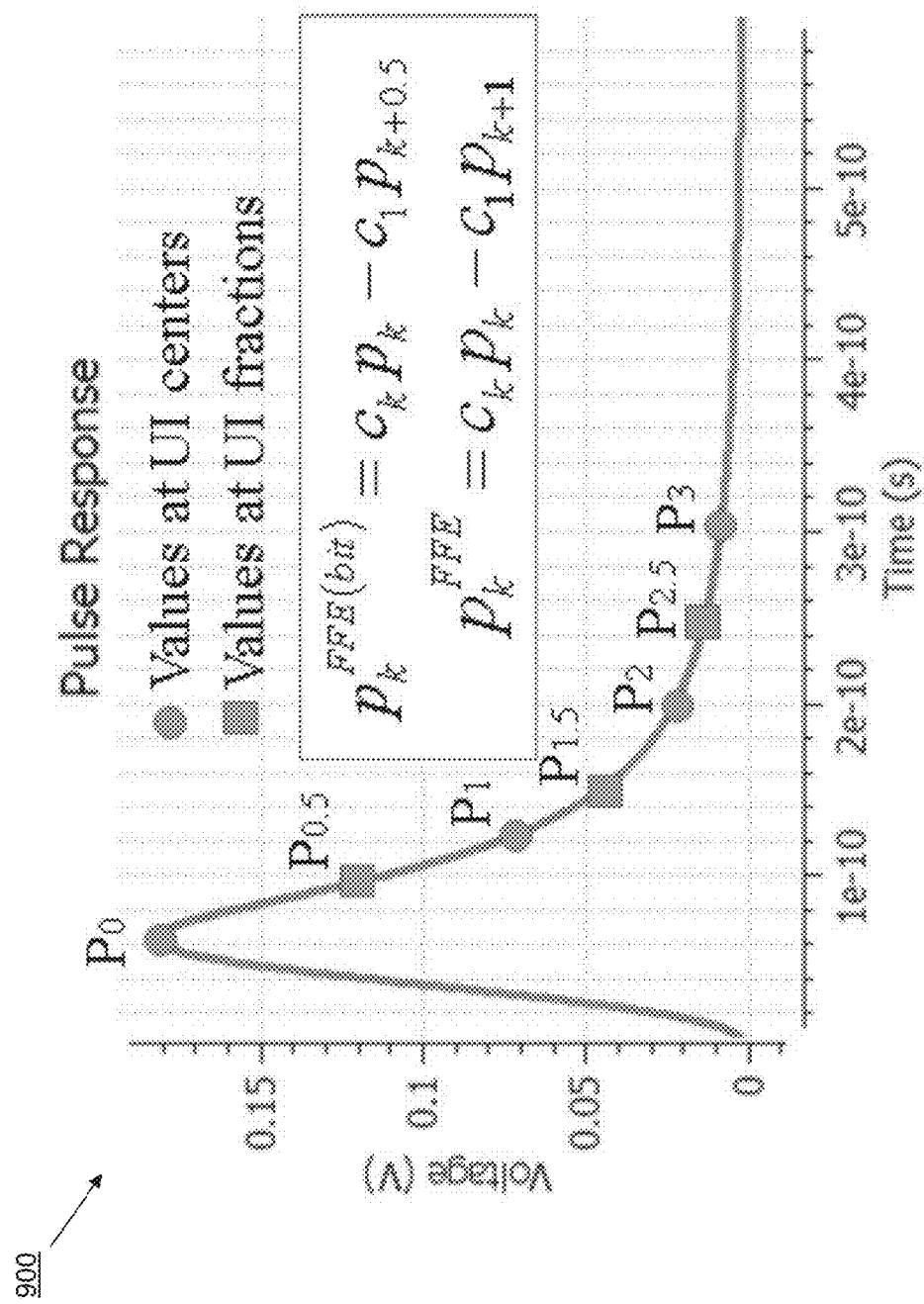
FIG. 9 is a graph illustrating an embodiment of taps in a pulse response of a high speed serial link.

The method 300 provides for the determination of whether per-bit equalization or per-symbol equalization will be more effective for a particular channel, and then applies the determined equalization technique to signals transmitted via that channel. Referring now to FIG. 9, an embodiment of a pulse response 900 for a high speed serial link is illustrated. In the illustrated embodiment, per-symbol equalization taps are represented as $P_1$, $P_2$, $P_3$, etc., while per-bit equalization taps are represented as $P_{0.5}$, $P_{1.5}$, $P_{2.5}$, etc. As would be understood by one of skill in the art in possession of the present disclosure, equalization taps are associated with decreases in the size of the signal (e.g., as discussed above with reference to FIGS. 6 and 7). As can be seen in FIG. 9, as the number of equalization taps increase, their value in reducing the pulse response decreases, and begins to have little to no impact on decreasing the size of the signal. As discussed below, the method 300 leverages this behavior to make a determination of whether per-bit equalization or per-symbol equalization should be performed on a signal being transmitted via a particular channel.

The method 300 begins at block 302 where BIOS performs link training. In different embodiments, the BIOS may perform block 302 during booting operations for the computing device 200 and/or during runtime operations of the computing device 200. In one example, at block 302, the BIOS 204 may operate to perform link training for the computing device 200 (a transmitter in this example) that will be communicating over a high speed link (e.g., provided in part by the communication subsystem 210) with another computing device (a receiver in this example) in order to tune equalization settings in the equalization engine 208b. As such, as would be understood by one of skill in the art in possession of the present disclosure, at block 302 the BIOS 204 may operate to determine a link speed (e.g., by sending its transmitter data rate capabilities and receiving the receivers data rate capabilities such that each may transition to a highest common data rate), and train the link (e.g., by operating the link at the agreed-upon speed; examining an eye diagram for a signal transmitted via the link and determining the quality of the signal based on eye diagram properties such as eye height, eye width, etc.; adjusting the equalization settings until the eye diagram has desirable properties that are indicative of a "desired" signal (i.e., a signal with desired properties); and terminating the link training once that desired signal is achieved.) In addition, information collected during the link training operations may be utilized to determine the effective equalization tap number and other values utilized in the method 300 as discussed below. While a specific link training procedure has been described as an example, one of skill in the art in possession of the present disclosure will recognize that link training may be performed in a variety of manners that will fall within the scope of the present disclosure as well.

The method 300 then proceeds to block 304 where the BIOS determines an effective equalization tap number. In an embodiment, at block 304 and subsequent to completing the link training at block 302, the BIOS operates to determine an effective equalization tap number. As discussed above with reference to FIG. 9, as the number of equalization taps utilized in an equalization technique increase, their value in reducing the pulse response decreases, and begin to have little to no impact on decreasing the size of the signal. As such, an effective equalization tap number may be defined that is indicative of a number of equalization taps that each provides an equalization result above a predetermined amount. For example, an effective equalization tap number n may be defined as the number of equalization taps that decrease the size of the signal by at least one percent. As such, with reference to the FFE equalizer output equation and the FFE transfer equation discussed above, the number of effective equalization taps may be provided by the equation:

$$k = n \text{ if } \frac{p_k^{FFE}}{p_{ISI}^{FFE}} = \frac{c_k p_k}{\sum_{k=1}^{N} |c_o p_k - c_1 p_{k+1}|} \geq 1\%$$

where k represents the bit number, n represents the number of estimated FFE taps, $p_k^{FFE}$ represents the product of the k+1 th tap coefficient and the pulse response at bit k, $p_{ISI}^{FFE}$ represents the summation of all products of tap coefficients and pulse response values that result in Inter-Symbol Interference (ISI) values, $c_k$ represents the k+1th tap, $p_k$ represents the pulse value at bit k, N represents the total number of available FFE taps, $c_0$ represents the first tap coefficient, and $c_1$ represents the second tap coefficient. However, while the equation above defines the effective equalization tap number as a number of equalization taps that each provide an equalization result that reduces a signal pulse response by an amount that is greater than or equal to one percent, one of skill in the art in possession of the present disclosure will recognize that effective equalization tap numbers may be defined differently (e.g., a number of equalization taps that each provide an equalization result that reduces a signal pulse response by an amount that is greater than some other percentage) while remaining within the scope of the present disclosure.

The method 300 then proceeds to decision block 306 where the BIOS determines whether the effective equalization tap number is greater than a fraction of an available equalization tap number. In an embodiment, at or before decision block 306, a determination may be made of an available equalization tap number that is indicative of a number of equalization taps that are available for equalizing a signal sent via the link for which link training was performed in block 302. As would be understood by one of skill in the art in possession of the present disclosure, the channel being used to generate and transmit the signal via the link that was trained in block 302 will be capable of providing a particular number of equalization taps for equalizing that signal. For example, the silicon package utilized in the channel will be capable of a particular number of equalization taps, and thus that particular number of equalization taps may be defined as the available number of equalization taps. In an embodiment, the determination of the available number of available equalization taps may be performed by the BIOS during the link training at block 302, although other techniques for determining the number of equalization taps that are available to equalize a signal when utilizing a particular channel to transmit that signal may be employed in the method 300 while remaining within the scope of the present disclosure.

Figure 10:
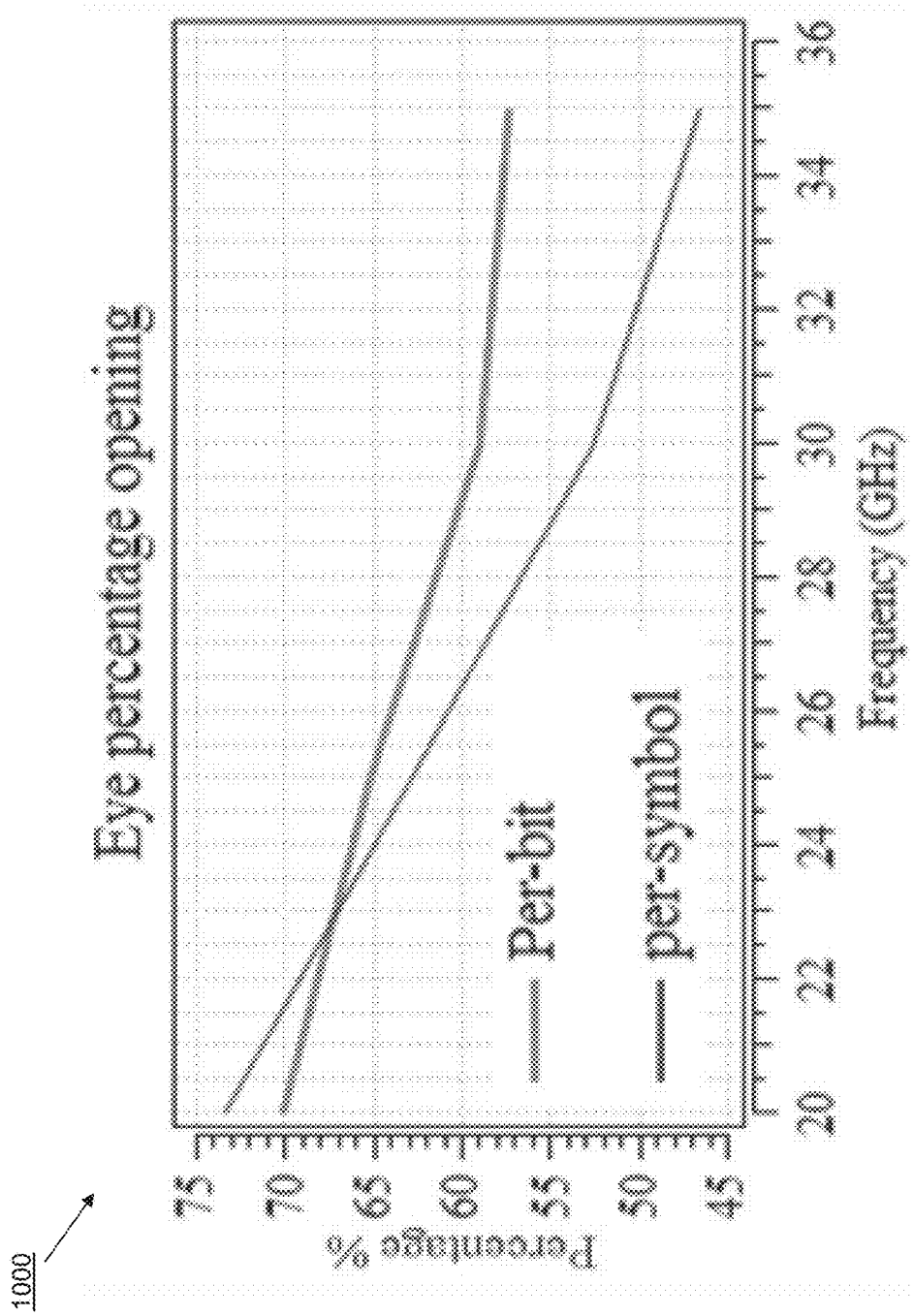
FIG. 10 is a graph illustrating an embodiment of the eye opening percentage vs. transmission speed for a channel in response to both per-symbol equalization and per-bit equalization.

In an embodiment, at decision block 306, the BIOS 204 may operate to determine whether the effective equalization tap number is greater than a predetermined fraction of the available equalization tap number. For example, in some experimental embodiments, a predetermined fraction of one-half was utilized at block 306 because it was found that it provided an optimal transition between the utilization of per-bit equalization and per-symbol equalization for those experiential embodiments. For example, with reference to FIG. 10, a graph 1000 illustrates the eye opening percentage for a channel provided in an experimental embodiment in response to both per-symbol equalization and per-bit equalization and, as can be seen, per-symbol equalization provides a greater eye opening percentage for the signal transmitted below approximately 23 GHZ transmission speeds, while the per-bit equalization provides a greater eye opening percentage for the signal transmitted above approximately 23 GHZ transmission speeds, illustrating how signal transmission speed can effect which equalization technique provides the most desirable signal. Furthermore, in some experimental embodiments, it was found that per-symbol equalization provided more desirable signals with channels having relatively large Inter-Symbol Interference (ISI) and/or reflections, while per-bit equalization provided more desirable signals with channels having relatively controlled ISI and/or reflections As such, the predetermined fraction of the available equalization tap number may be selected based on those factors. However, while a few specific examples have been provided, one of skill in the art in possession of the present disclosure will recognize that the predetermined fraction may be selected based on a variety of other factors remaining within the scope of the present disclosure.

If, at decision block 306, it is determined that the effective equalization tap number is greater than the fraction of the available equalization tap number, the method 300 proceeds to block 308 where the BIOS causes per-symbol equalization to be performed on a signal. In an embodiment, at block 308 and in response to determining that the effective equalization tap number (e.g., the number of equalization taps that each provide an equalization result that is greater than or equal to one percent) is greater than the fraction (e.g., ½) of the available equalization tap number, the BIOS 204 may operate to cause the equalization engine 208b to perform per-symbol equalization (e.g., using the effective equalization tap number to determine the number of equalization taps in the per-symbol equalization) on signals generated by the signal information generation subsystem 206 and modulated by the PAM4 engine 208a to provide equalized, modulated signals.

If, at decision block 306, it is determined that the effective equalization tap number is less than or equal to the fraction of the available equalization tap number, the method 300 proceeds to block 310 where the BIOS causes per-bit equalization to be performed on a signal. In an embodiment, at block 310, and in response to determining that the effective equalization tap number (e.g., the number of equalization taps that each provide an equalization result that is greater than or equal to one percent) is less than the fraction (e.g., ½) of the available equalization tap number, the BIOS 204 may operate to cause the equalization engine 208b to perform per-bit equalization (e.g., using the effective equalization tap number to determine the number of equalization taps in the per-bit equalization) on signals generated by the signal information generation subsystem 206 and modulated by the PAM4 engine 208a to provide equalized, modulated signals.

Following block 308 or 310, the method 300 proceeds to block 312 where the signal is transmitted. In an embodiment, at block 312, the signal information generated by the signal information generation subsystem 206, modulated by the PAM4 engine 208a, and equalized by the equalization engine 208b (e.g., via per-symbol or per-bit equalization according to blocks 308 or 310 above) to provide the modulated, equalized signals discussed above may be provided to the communication subsystem 210 for transmission to another computing device.

Thus, systems and methods have been described that provide for the application of different equalization techniques on a modulated signal based on whether a number of taps that is considered effective in performing equalization is greater than some fraction of the number of taps that are available via the channel being used to transmit that signal. As such, for different channels, the same channel with modified components, and/or the same channel transmitting signals at different speeds, an effective number of equalization taps is compared with an available number of equalization taps to select one of a plurality of equalization techniques for application to modulated signals in order to transmit the equalized, modulated signals with the most desirable characteristics (i.e., relative to modulated signals equalized via the other equalization techniques.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pulse amplitude modulation equalization optimization system, comprising:
   a Pulse Amplitude Modulation (PAM) engine;
   an equalization engine that is coupled to the PAM engine; and
   a Basic Input/Output System (BIOS) that is coupled to the PAM engine and the equalization engine, wherein the BIOS is configured to:
     determine an effective equalization tap number that is indicative of a number of equalization taps that each provide an equalization result above a predetermined amount;
     determine whether the effective equalization tap number is greater than a predetermined fraction of an available equalization tap number, wherein the available equalization tap number is indicative of a number of equalization taps that are available for equalizing a signal;
     cause, when the effective equalization tap number is greater than the predetermined fraction of the available equalization tap number, the equalization engine to perform per-symbol equalization on signals modulated using the PAM engine; and
     cause, when the effective equalization tap number is not greater than the predetermined fraction of the available equalization tap number, the equalization engine to perform per-bit equalization on signals modulated using the PAM engine.

2. The system of claim 1, wherein the PAM engine is configured to modulate signals using a four level PAM scheme (PAM4).

3. The system of claim 1, wherein the equalization engine is configured to perform Feed Forward Equalization (FFE).

4. The system of claim 1, wherein the equalization result that is above the predetermined amount includes an equalized signal change that is greater or equal to one percent.

5. The system of claim 1, wherein the predetermined fraction of the available equalization tap number is half the available equalization tap number.

6. The system of claim 1, wherein the BIOS is configured to:
perform link training operations in a pre-boot environment; and
complete the link training operations prior to determining the effective equalization tap number in the pre-boot environment.

7. The system of claim 1, wherein the BIOS is configured to:
perform link training operations in a runtime environment; and
complete the link training operations prior to determining the effective equalization tap number in the runtime environment.

8. An Information Handling System (IHS), comprising:
a modulation subsystem;
a processing system that is coupled to the modulation subsystem; and
a memory system that is coupled to the processing system and that includes instruction that, when executed by the processing system, cause the processing system to perform operations comprising:
determining an effective equalization tap number that is indicative of a number of equalization taps that each provide an equalization result above a predetermined amount;
determining whether the effective equalization tap number is greater than a predetermined fraction of an available equalization tap number, wherein the available equalization tap number is indicative of a number of equalization taps that are available for equalizing a signal;
causing, when the effective equalization tap number is greater than the predetermined fraction of the available equalization tap number, the modulation subsystem to perform per-symbol equalization on signals modulated using Pulse Amplitude Modulation (PAM); and
causing, when the effective equalization tap number is not greater than the predetermined fraction of the available equalization tap number, the modulation subsystem to perform per-bit equalization on signals modulated using PAM.

9. The IHS of claim 8, wherein the signals are modulated using four level PAM (PAM4).

10. The IHS of claim 8, wherein the equalization is Feed Forward Equalization (FFE).

11. The IHS of claim 8, wherein the equalization result that is above the predetermined amount includes an equalized signal change that is greater or equal to one percent.

12. The IHS of claim 8, wherein the predetermined fraction of the available equalization tap number is half the available equalization tap number.

13. The IHS of claim 8, wherein the BIOS is configured to:
perform link training operations in a pre-boot environment; and
complete the link training operations prior to determining the effective equalization tap number in the pre-boot environment.

14. A pulse amplitude modulation equalization optimization method, comprising:
determining, by a Basic Input/Output System (BIOS), an effective equalization tap number that is indicative of a number of equalization taps that each provide an equalization result above a predetermined amount;
determining, by the BIOS, whether the effective equalization tap number is greater than a predetermined fraction of an available equalization tap number, wherein the available equalization tap number is indicative of a number of equalization taps that are available for equalizing a signal;
causing, by the BIOS when the effective equalization tap number is greater than the predetermined fraction of the available equalization tap number, a modulation subsystem to perform per-symbol equalization on signals modulated using Pulse Amplitude Modulation (PAM); and
causing, by the BIOS when the effective equalization tap number is not greater than the predetermined fraction of the available equalization tap number, the modulation subsystem to perform per-bit equalization on signals modulated using PAM.

15. The method of claim 14, wherein the signals are modulated using four level PAM (PAM4).

16. The method of claim 14, wherein the equalization is Feed Forward Equalization (FFE).

17. The method of claim 14, wherein the equalization result that is above the predetermined amount includes an equalized signal change that is greater or equal to one percent.

18. The method of claim 14, wherein the predetermined fraction of the available equalization tap number is half the available equalization tap number.

19. The method of claim 14, further comprising:
performing, by the BIOS, link training operations in a pre-boot environment; and
completing, by the BIOS, the link training operations prior to determining the effective equalization tap number in the pre-boot environment.

20. The method of claim 14, further comprising:
performing, by the BIOS, link training operations in a runtime environment; and
completing, by the BIOS, the link training operations prior to determining the effective equalization tap number in the runtime environment.

* * * * *